United States Patent [19]

Hauck

[11] Patent Number: 5,499,036
[45] Date of Patent: Mar. 12, 1996

[54] DISPLAY CONTROL APPARATUS AND METHOD OF USING SAME

[75] Inventor: Lane T. Hauck, San Diego, Calif.

[73] Assignee: Proxima Corporation, San Diego, Calif.

[21] Appl. No.: 115,310

[22] Filed: Sep. 1, 1993

Related U.S. Application Data

[63] Continuation-in-part of Ser. No. 823,301, Jan. 21, 1992, abandoned, which is a continuation of Ser. No. 546,238, Jun. 29, 1990, abandoned, and a continuation-in-part of Ser. No. 506,621, Apr. 9, 1990, abandoned, which is a continuation-in-part of Ser. No. 472,668, Jan. 30, 1990, abandoned, which is a continuation-in-part of Ser. No. 222,144, Jul. 21, 1988, abandoned.

[51] Int. Cl.$^6$ ............................ G09G 5/00; G09G 3/36
[52] U.S. Cl. ................................ 345/3; 345/88; 345/153
[58] Field of Search ........................ 345/87, 88, 150, 345/153, 1, 2, 3

[56] References Cited

U.S. PATENT DOCUMENTS

| | | | |
|---|---|---|---|
| 4,652,101 | 3/1987 | Grunwald | 353/122 |
| 4,812,034 | 3/1989 | Mochizuki et al. | 353/122 |
| 4,846,694 | 7/1989 | Erhardt | 434/365 |
| 4,880,303 | 11/1989 | Grunwald | 353/122 |
| 4,882,599 | 11/1989 | Grunwald | 353/60 |
| 4,944,578 | 7/1990 | Denison | 353/122 |
| 4,953,971 | 9/1990 | Highfill | 353/122 |
| 4,976,536 | 12/1990 | Vogeley et al. | 353/77 |
| 5,041,965 | 8/1991 | Chun | 353/122 |
| 5,101,197 | 3/1992 | Hix et al. | 353/122 |

FOREIGN PATENT DOCUMENTS

| | | |
|---|---|---|
| 0918415 | 1/1973 | Canada . |
| 1225476 | 8/1987 | Canada . |
| 2559923 | 8/1985 | France . |

OTHER PUBLICATIONS

Barry Simon and Richard Wilson, "*DOCUMENTATION FOR CTRALT*" Version 1.0, pp. 1–4, 7 and 8.

*Primary Examiner*—Richard Hjerpe
*Assistant Examiner*—Steven J. Saras
*Attorney, Agent, or Firm*—Bernard L. Kleinke; Jerry R. Potts

[57] ABSTRACT

A method and display control apparatus includes a display controller for supplying display information indicative of images to be displayed, to a display device, which, in turn, displays images in accordance with the display information. The controller is arranged to receive selectively control commands encoded in the display information received from a remote video signal producing system, such as a personal computer, for control purposes. In one form of the invention, the control commands are used to freeze the image being displayed by the display device, so that the personal computer can determine the next images to be displayed by the display device.

21 Claims, 6 Drawing Sheets

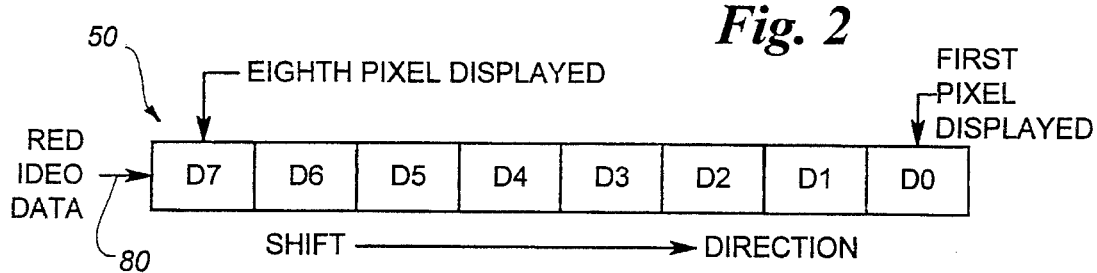
Fig. 2
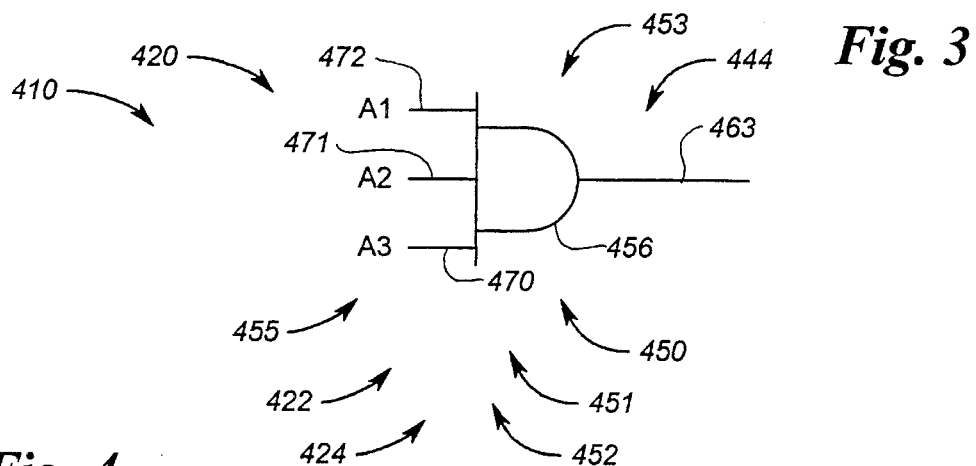
Fig. 3
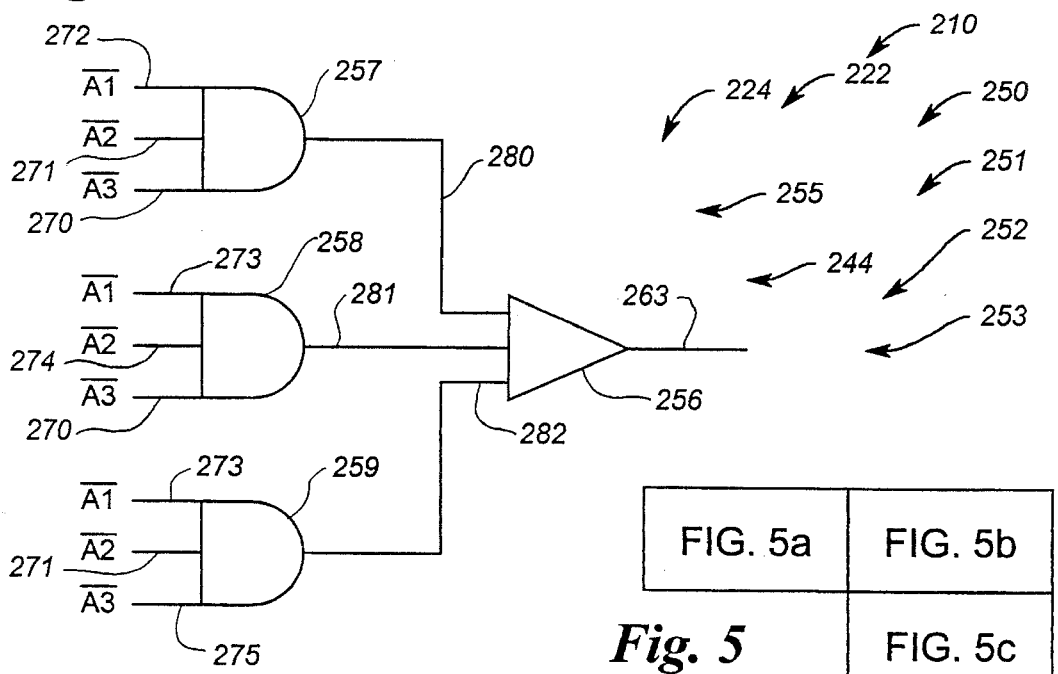
Fig. 4
Fig. 5

DISPLAY CONTROL APPARATUS AND METHOD OF USING SAME

CROSS-REFERENCE TO RELATED APPLICATIONS

This application is a continuation-in-part of U.S. patent application Ser. No. 07/823,301 filed Jan. 21, 1992, now abandoned, entitled "STACKED DISPLAY PANEL CONSTRUCTION AND METHOD OF MAKING SAME," which is a continuation of U.S. patent application Ser. No. 07/546,238 entitled "STACKED DISPLAY PANEL CONSTRUCTION AND METHOD OF MAKING SAME," filed Jun. 29, 1990 now abandoned and a continuation-in-part of U.S. patent application Ser. No. 07/506,621 entitled "STACKED DISPLAY PANEL CONSTRUCTION AND METHOD OF MAKING SAME," filed Apr. 9, 1990, now abandoned, which is a continuation in part of U.S. patent application Ser. No. 07/472,668 filed Jan. 30, 1990, now abandoned, which is a continuation-in-part of U.S. patent application Ser. No. 07/222,144 filed Jul. 21, 1988 entitled "GRAY SCALE SYSTEM FOR VISUAL DISPLAYS," now abandoned. Each of the above-referenced patents and patent applications are incorporated herein by reference as though fully set forth herein.

TECHNICAL FIELD

This invention relates in general to a display control apparatus and method of using it. More particularly, the invention relates to a display control apparatus and method of controlling a display image, in an efficient and effective manner.

BACKGROUND ART

Display control apparatus has been well known for use in controlling the display of video information by a display device such as a liquid crystal display panel. In this regard, modern personal computers usually contain a video drive module adapted to be coupled to a video monitor to communicate information necessary to create an image on the screen of the monitor. For example, reference may be made to the following U.S. Pat. Nos.: 4,652,101; 4,812,034; 4,846,694; 4,880,303; 4,882,599; 4,944,578; 4,953,971; 4,976,536; 5,041,965; and 5,101,197.

While such display control apparatus may have been satisfactory for many applications, it would be highly desirable to have a display control apparatus which would enable a display controller for a display device to initiate independent control functions, even while an image is in the process of being displayed.

As an example of such an application, liquid crystal display panels have been driven remotely by personal computers, so that the image formed by the display panel, can be projected onto a large screen or a wall. In this manner, computer generated images, produced by the personal computer, can be projected by an overhead projector onto a suitable viewing surface to permit a large number of persons to view the computer information. For example, reference may be made to the prior mentioned patent applications.

It would be highly desirable to enable the computer to communicate with the display panel even while it is generating an image. By so doing, control signals or commands could be utilized by the display panel for other functions. For example, while an image is being generated by the display panel, the computer could send a command to cause the display image to be altered, or to remain unchanged.

Such a new display control apparatus should be able to be used, without the necessity of providing special cabling or ports. Also, such an apparatus should be relatively inexpensive to manufacture, and convenient to use.

DISCLOSURE OF INVENTION

Therefore the principal object of the present invention is to provide a new and improved display control apparatus and method of using it, to enable a display controller for a display device to initiate independent control functions, even while an image is in the process of being displayed.

Another object of the present invention is to provide such a new and improved display control apparatus which requires no special cabling or ports coupling the display controller and the display device, and which can be manufactured at a relatively low cost and can be used in a convenient manner.

Briefly, the above and further objects of the present invention are realized by providing a display control apparatus and method of using it, for providing independent control of an image being displayed.

A method and display control apparatus includes a display controller for supplying display information indicative of images to be displayed, to a display device, which, in turn, displays images in accordance with the display information. The controller is arranged to receive selectively control commands encoded in the display information received from a remote video signal producing system, such as a personal computer, for control purposes. In one form of the invention, the control commands are used to freeze the image being displayed by the display device, so that the personal computer operator can determine the next images to be displayed by the display device without disrupting the projected image.

In the display control apparatus, the display device or unit includes a liquid crystal display panel, and the controller includes a buffer memory unit. The display control apparatus includes an encoding or detection circuit, for responding to a predetermined series of digitized video signals to prevent or allow more than a single frame of video display information to be stored in the buffer memory unit.

In response to the detection circuit, a gating circuit permits one or more frames of video display information to be stored in the buffer memory unit. Video display information displayed by the above mentioned other display unit, is displayed either simultaneously by the liquid crystal display panel in a live mode of operation, or held to a single frame of video display information on the liquid crystal display panel in a hold mode of operation.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein:

FIG. 2 is a diagrammatic block diagram of a shift register of the apparatus of FIG. 1;

FIG. 3 is a schematic diagram of a display apparatus, which is also constructed in accordance to the present invention, and only a portion of which is shown for illustration purposes;

FIG. 4 is a schematic diagram of a display apparatus, which is also constructed in accordance to the present invention, and only a portion of which is shown for illustration purposes;

BEST MODE FOR CARRYING OUT THE INVENTION

Figure 1:
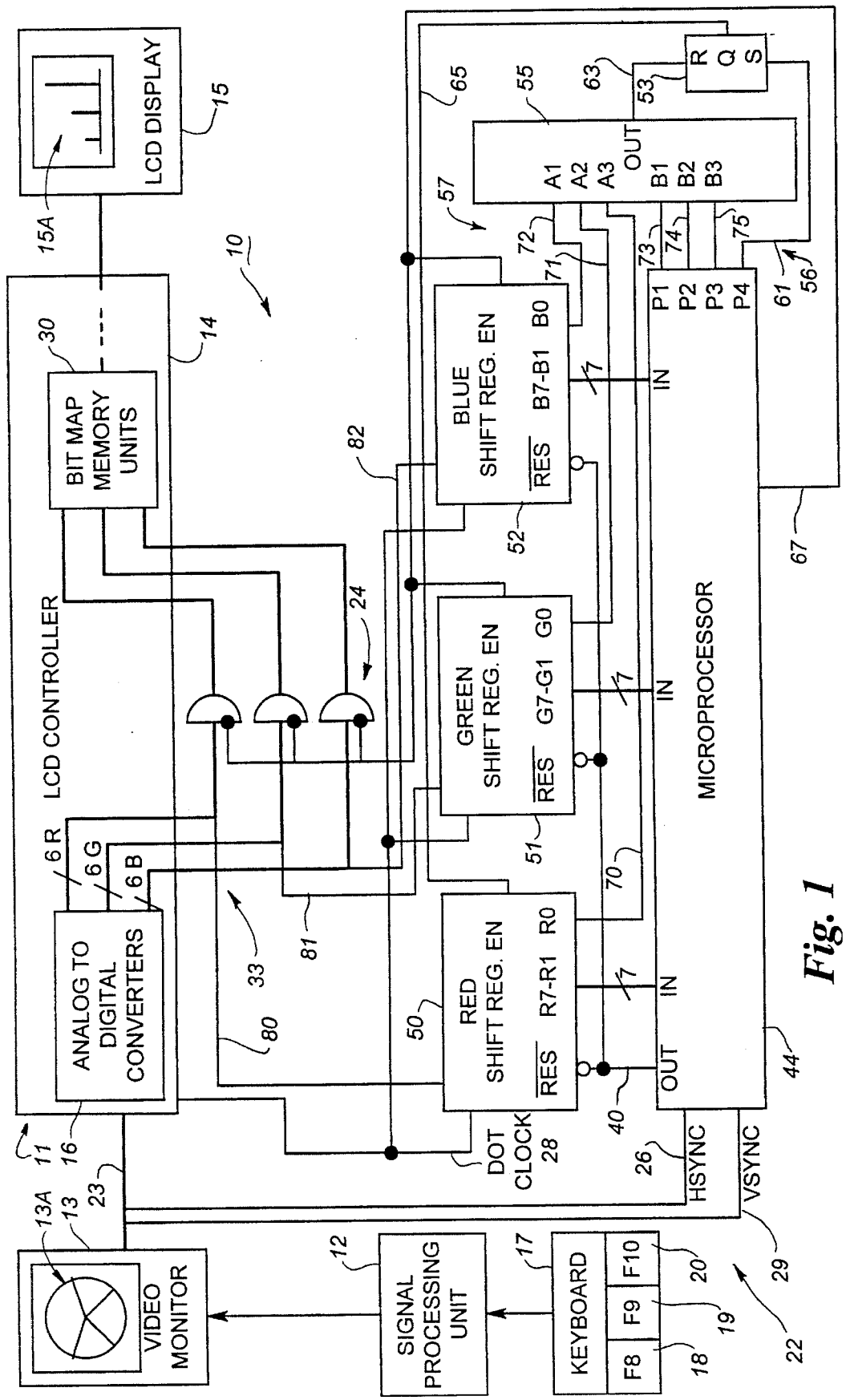
FIG. 1 is a block diagram of a display control apparatus, which is constructed according to the present invention, and which is shown coupled between a computer system having a video monitor, and a liquid crystal display system having a liquid crystal display panel.

Referring now to the drawings, and more particularly to FIG. 1, there is shown a display control apparatus 10 which is constructed in accordance with the present invention, and which is illustrated coupled between a liquid crystal display system 11 for driving a liquid crystal display panel 15, and a video signal producing system in the form of a personal computer 12 for generating video display information signals, and supplying them to a video monitor 13 for displaying video display information.

In accordance with the present invention, the controller system (personal computer 12) supplies display information indicative of images to be displayed, to the display device, which, in turn, displays images, such as the bar graph image 15A on the panel 15. The controller is arranged to receive selectively control commands encoded in the display information received from the personal computer 12, for control purposes. In one form of the invention, the control command signals are used to freeze the image 15A being displayed, so that the personal computer 12 can determine the next images to be displayed by the display device. In this regard, an image 13A on the video monitor 13 of the personal computer 12 can be different from the image 15A of the display device 15. In this manner, for example, the user can cause the execution of a program in the computer 12 and preview different images before sending the next image to be displayed to the controller 11 and the display device 15.

The liquid crystal display system 11 includes a liquid crystal display controller 14 having an analog to digital converter device 16 and a bit map memory array 30 for storing the video information converted by the device 16 and a liquid crystal display panel 15.

The analog to digital converter device 16 digitizes and synchronizes the incoming video information received from the personal computer 12 for storage into the bit map memory array 30. The liquid crystal display controller 14, the analog to digital converter device 16, the bit map memory 30 and other circuits associated with the display system 14 are more fully described in U.S. patent application 07/586,506 and will not be described hereinafter in greater detail, except to note that gating of video information into the bit map memory array 30 is controlled by the data display control apparatus 10. The gating of the video information into the bit map memory array 30 will be described in greater detail.

Coupling the data display control apparatus 10 between the personal computer 12 and the liquid crystal display system 14 enables the data display control apparatus 10 to control the liquid crystal display 14 so that it displays the same frames of video information as displayed concurrently by the video monitor 13 or a single frame of selected video information displayed by the video monitor 13. This former mode of operation is known as the LIVE mode of operation, while the latter mode of operation is known as the HOLD mode of operation.

A user can 1) select a given frame of video display information he or she is viewing on the video monitor 13 and liquid crystal display panel 15 simultaneously; 2) freeze a selected or viewed frame of the video display information such as a frame 15A so the liquid crystal display panel 15 displays the same frame of video information repetitively over a large number of consecutive frames; or 3) view new frames of video display information on the video monitor 13, such as a frame 13A while the single selected frame of video information 15A is being displayed repetitively on the liquid crystal display panel 15.

While in the preferred form of the present invention, the display control apparatus 10 controls the displaying of video display information by a video monitor and liquid crystal display panel, it will be understood by those skilled in the art that the display control apparatus 10 can control any equipment adapted to receive video information from a video signal producing device.

Also while the preferred form of the present invention describes a video monitor as part of a personal computer system, it should be understood that a separate or auxiliary monitor could also be employed in the inventive system.

Referring now to FIG. 1, the display control apparatus 10 generally includes a detection circuit 22 for generating command signals to control the storing of video display information into the bit map memory array 30 and a buffer or gating circuit 24 responsive to the encoder circuit 22 for gating the video information into the bit map memory array 30. In this regard, if the detection circuit 22 in response to a LIVE command signal transmitted in the video information signals, detects the LIVE commands and generates a control signal 67 indicative of the LIVE mode when the signal 67 is a logical HIGH.

The buffer unit 24 responds to the control signal 67 and permits all video display information digitized by the analog to digital converter 16 to be stored in the bit map memory array 30. This arrangement enables the liquid crystal display panel 15 to display simultaneously the same video display information as the video monitor 13. For example, image 13A would be displayed both on the video monitor 13 and on the liquid crystal display panel 15.

In response to a HOLD command signal transmitted in the video information signals, if the detection circuit 22 detects the HOLD command and causes the control signal 67 to go to a logical LOW inhibiting any further video information digitized by the analog to digital converters 16 from being stored in the bit map memory array 30. In this regard, the buffer unit 24 permits only a single frame of video information to be stored in the bit map memory array 30. Thus, when the stored information is retrieved from the bit map memory array 30 for display purposes, the stored information remains fixed or unchanged permitting the same frame of video information to be displayed repetitively by the liquid crystal display panel 15.

Considering now the operation of the display control apparatus 10 in greater detail, the video information displayed by the video monitor 13 is controlled by an internal dot or pixel clock (not shown) generated by the signal producing device 12. This dot clock signal is not available to the display control apparatus 10, nor the liquid crystal display controller 14.

However, the dot clock signal is required by the liquid crystal display controller 14 for synchronizing the digitizing of the analog video information received from the control processing unit 12 to assure the simultaneous displaying of the same video information on the liquid crystal display panel 15 and the video monitor 13.

In order to assure the proper synchronization between the video images displayed by the video monitor 13 and the liquid crystal display panel 15, the liquid crystal display controller 14 reconstructs the dot clock from a horizontal synchronization (HSYNC) signal 26 via a pixel clock generator (not shown). The pixel clock generator is more fully described in U.S. patent application Ser. No. 07/586,506 and will not be described herein in greater detail. It should be understood however, that the phase of the dot clock signal 28 is adjusted so that the digitizing of the incoming analog video signal does not occur while the analog video signal is in transition.

In order to further understand the operation of the display control apparatus 10, it should be understood that the detection circuit 22 is responsive to certain sequences of digitized video information received from the central processing unit 12 via the liquid crystal display controller 14. In this regard, the analog to digital converters 16 converts the analog signals received from the control processing unit 12 into digital signals.

Once the signals are digitized, the analog to digital converters 16 is strobed on the leading edge of each dot clock 28. Thus, when the leading edge of the dot clock 28 occurs, the analog to digital converters 16 convert an analog video signal 23 from the central processing unit 12 into a set of digitized video information signals indicated generally at 33. As will be explained hereinafter, the most significant bits of digitized R-G-B signals produced by the analog to digital converters are utilized by the data display control apparatus 10 for generating the command signals.

Considering now the LIVE mode command and the HOLD mode command in greater detail, the LIVE mode command requires a 16 pixel sequence which includes an 8-pixel message sequence followed by its complement to help ensure that the detection circuit 22 is not accidentally triggered by data in the video information which happens to have the same 8-pixel message combination. To further help protect again false triggering, the detection circuit 22 is also constructed to respond to pixel information for a certain predefined location on the pixel matrix of the liquid crystal display panel 15. In the preferred form of the present invention the predefined location is disposed at the first 8-pixels in the upper left hand corner of the displayed image.

To initiate the LIVE mode of operation, the first byte of displayed data (upper left corner, first 8 pixels) changes to a pattern such as a black and white pattern WW BB WW WW (hex $CF, binary 11001111, where 1=white, 0=black). This pattern will last at least one complete frame, but may persist for many consecutive frames of video information.

The next byte of display data then changes to the complement of the previous byte: BB WW BB BB (hex $30, binary 00110000). This pattern also lasts at least one frame, but may persist for many consecutive frames of video information.

Once the message and its complement have been transmitted by the signal producing device 12, the black and white 8-bit pattern is replaced with video information displayed by the video monitor 13.

To initiate the HOLD command, the first byte of display data (upper left corner, first 8-pixels) changes to a black white pattern WW WW BB WW (hex $F3, binary 11110011, where 1=white, 0=black). This pattern will last one complete frame, but may persist for many consecutive frames of video information.

The next byte of display data then changes to the complement of the previous byte: BB BB WW BB (hex $0C, binary 00001100). This pattern also lasts at least one frame, but may persist for many consecutive frames of video information.

Once the messages and its complement have been transmitted by the signal producing device 12, the black and white 8-bit pattern is replaced with video information displayed by the video monitor 13.

It should be understood, the transition between the message pattern and its complement occurs during a retrace period which insures that there will be no inherent "interim" values of the code byte between the message and its complement.

It will be understood by those skilled in the art, that the technique for changing the video information transmitted by the personal computer 12 to the data display control apparatus 10 may be implemented by conventional window screen displayed on the video monitor 13. In this regard, a window application program adapted for use with the apparatus 10 causes a small control panel to be displayed on the monitor 13 which overlays any normal window screen. Thus, when the user clicks on the displayed control panel, the "HOLD" command is sent in the video stream, which causes the "HOLD" control signal 67 to go to a logical LOW, which in turn, causes the liquid crystal display 15 to display the same frame of video data repetitively.

When the user clicks on this displayed control panel again, a "LIVE" command is sent in the video stream, which causes the control signal 63 to go to a logical HIGH, which in turn, causes the liquid crystal display panel 15 to display the same information displayed on the video monitor 13.

While specific code values have been described in the preferred form of the invention it will be understood by those skilled in the art that the number of bits and the values of these codes are arbitrary, thus any arbitrary code values may be chosen to implement the necessary command signals.

It will also be understood by those skilled in the art, that the sending of the command codes in the video stream could be implemented by using function codes from a keyboard, such as a keyboard 17 associated with the personal computer 12. Thus, for example, the function keys of the keyboard, such as an F8 function key 18 causes the "HOLD" command to be sent, an F9 function key 19 causes the "LIVE" command to be sent, and an F10 function key 20 causes a toggle effect; i.e. it causes the "LIVE" command to be sent, followed by a waiting period of 0.1 to 10 seconds, followed by the "HOLD" command.

With this arrangement, the F10 function key 20 would be used most of the time by displaying the desired screen on both the video monitor 13 and the display panel 15, followed by actuating the F10 key 20 to cause the selected frame to be displayed repetitively on the display panel 15, and then resuming video information on the video monitor 13. The F8 and F9 keys 18 and 19 can be used if the user wants to go to LIVE for an extended period of time, for example to display a slide-to-slide transition effect.

For full color displays, the "HOLD" command may be initiated by a first byte of display data (upper left corner, first 8-pixels) changes to a cyan-magenta pattern CC CC MM CC where C=cyan=B+G and where M=magenta=R+B. This pattern will last at least one complete frame.

The next byte of display data then changes to the complement of the first pattern. In this regard, a red-green pattern RRRRGGRR where R=red=complement of cyan and G=green=complement of magenta. This pattern lasts at least one full frame period.

To initiate the "LIVE" command, a first byte of displayed data (upper left corner, first 8-pixels) changes to a yellow magenta pattern YYMMYYYY where Y=yellow=R+G and where M=magenta=R+B. This pattern lasts at least one frame period.

The next byte of display data then changes to the complement of the first pattern. In this regard, a blue-green pattern BBGG BBBB where B=blue=complement of yellow and G=green=complement of magenta. These colors are standard colors in the conventional window palette.

Considering now the detection circuit 22 in greater detail with reference to FIG. 1, the detection circuit 22 generally includes a microprocessor 44 for controlling the detection of specific bit patterns and a set of shift registers 50, 51 and 52 for temporarily storing the most significant digitized bits from the red, green and blue signals received from the analog to digital converters 16. The shift registers 50–52 are connected to the pixel clock 28 and the most significant bits of the digitized red, green and blue video signals by a set of electrical conductors 80, 81 and 82 respectively.

The microprocessor 44 controls the operation of the shift registers 50–52 and the reading of information therefrom. In this regard, the microprocessor 44 generates a reset signal 40 which causes all the shift registers 50–52 to be cleared (all zeros) and an enable signal 65 which enable the serial input data received by the shift registers to be shifted on each pixel clock signal 28.

FIG. 2 illustrates the shifting of video data through one of the shift registers, such as the shift register 50. As the shifting of data through registers 50–52 is substantially identical only the shifting of data through register 50 will be described.

As best seen in FIG. 2, for any eight pixels shifted into register 50, D0 represents the first bit of pixel information shifted into the register 50. In this regard, if the shift register 50 was allowed to operate continuously, the 8-bit data at the outputs D0–D7 of the register would cycle constantly in varying patterns, depending upon the video information displayed on the liquid crystal panel 15. It should be understood for proper operation, the detection circuit 22 must be able to differentiate special control information from other video information used for display purposes. To accomplish this objective, the microprocessor 44 enables the shift registers 50–52 for only preselected time intervals. This assures the gating circuit 65 will be enabled for only certain specific areas on the liquid crystal panel matrix screen.

The following example, is illustrative of the detection and gating circuits 22 and 24 respectively. In this regard, it is assumed that only the first eight pixels in a frame of displayed information will be tested. Thus, only that video data displayed in the upper left hand corner of the liquid crystal panel will be considered.

In operation, the microprocessor 44 generates the reset signal 40 when a VERTICAL SYNC signal 29 is produced by video drive module of the personal computer 12. The reset signal 40 causes the three shift register 50–52 to be cleared to zero. Once the registers 50–52 are cleared, the microprocessor 44 generates the enable signal 65 which remain active only for the first eight pixel clock periods in the first active horizontal line of the information displayed on the liquid crystal panel 15.

After the first eight bits of pixel information have been shifted into the shift register 50, the shift register 50 is disabled to prevent other video data from replacing the video information stored temporarily in the register 50. In this regard, it should be understood when the enable signal 65 goes to a logic LOW level, the information in register 50 is fixed so it may be sampled by the microprocessor 44. The sampled data in register 50, consists of the 7-bits from the digitized red video information.

While in the preferred form of the present invention, the first eight bits of video information is sampled or tested, it will be understood by those skilled in the art that any line of displayed information can be tested as the microprocessor 44 is coupled to both the HSYNC signal 26 and the VSYNC signal 29. Thus, the microprocessor 44 can be programmed to enable the shift registers 50–52 for any arbitrary horizontal video line, not just the first line as explained in the foregoing example. In this regard, the microprocessor 44 includes an internal counter (not shown) clocked by the HSYNC signal 26 and reset by the VSYNC signal 29. The internal counter thus keeps track of which horizontal line is being displayed and can activate the enable signal 65 for any arbitrary horizontal line count.

In order to control the enable signal 65 between a logical LOW level and a logical HIGH level, the detection circuit 22 also includes a control flip-flop 53. When the control flip-flop 53 is set, the enable signal 65 goes to a logical HIGH to enable the shift registers 50–52 to shift video information. Conversely, when the control flip-flop 53 is reset, the enable signal 65 goes to a logical LOW to lock or freeze the video information in the shift registers 50–52.

Referring again to FIG. 1, the flip-flop 53 is set by a set enable signal 61 which is generated for any particular horizontal scan line.

In order to reset the flip flop 53, the detection circuit 22 includes a logic array indicated generally at 55. The logic array 55 is responsive to a set 56 of input signals B1, B2 and B3 indicated generally at 73, 74 and 75 respectively. The set 56 of input signals is generated by the microprocessor 44. In this regard, the microprocessor 44 generates the B1–B3 signals 73–75 respectively to select various logic comparisons with another set 57 of input signals A1–A3 indicated at 70, 71 and 72 respectively.

As best seen in FIG. 2, the A1–A3 signals are indicative of the first bit in each shift register 50–52 respectively. In this regard, the first bit from each register is set aside as a non-zero "trigger" value. Thus, the logical array 55, detects the trigger value and generates a reset enable signal 63 to reset the flip-flop 53.

Figure 5A:
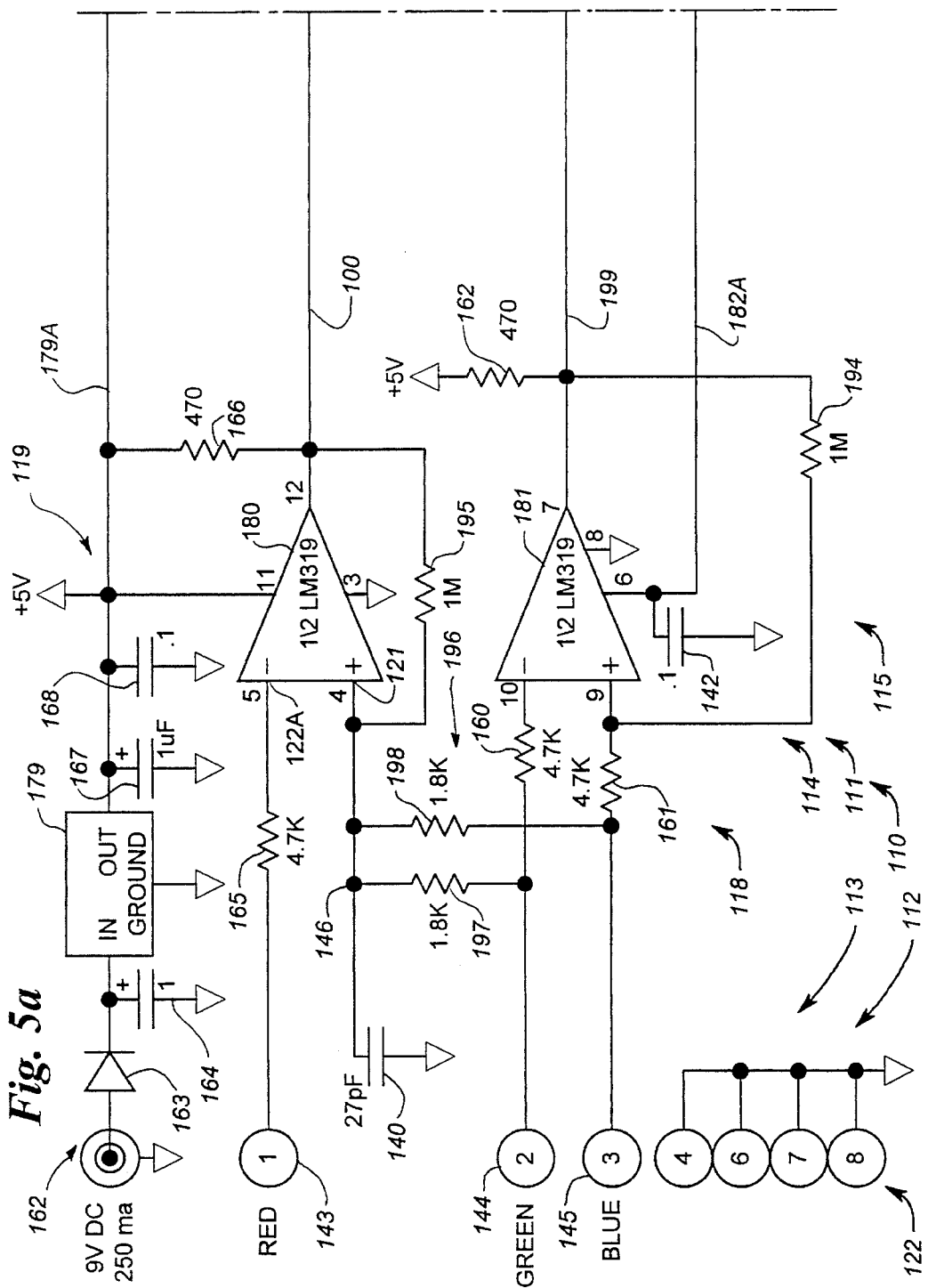
FIG. 5 is a block diagram of a display control apparatus, which is also constructed in accordance to the present invention.
Figure 5B:
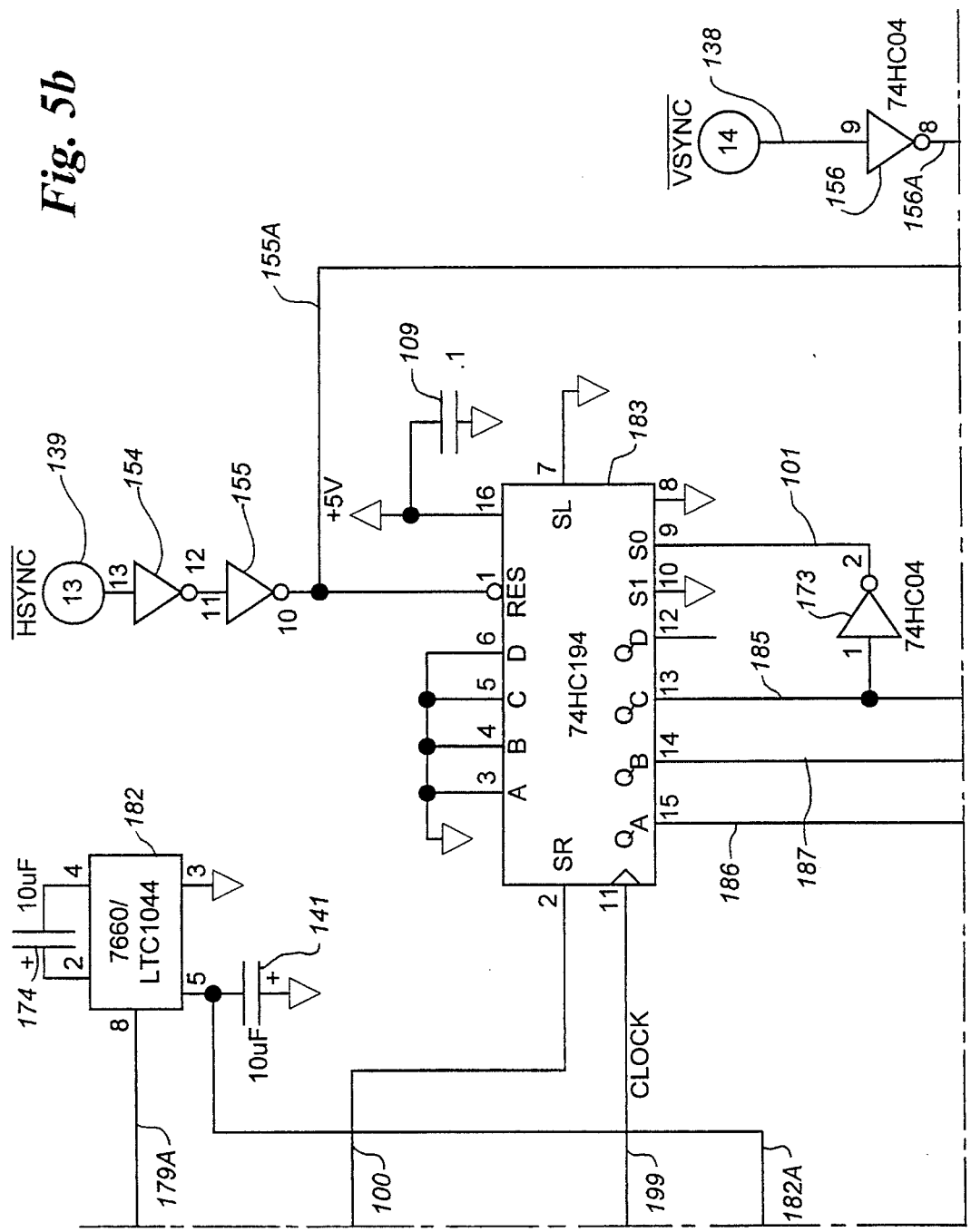
Figure 5C:
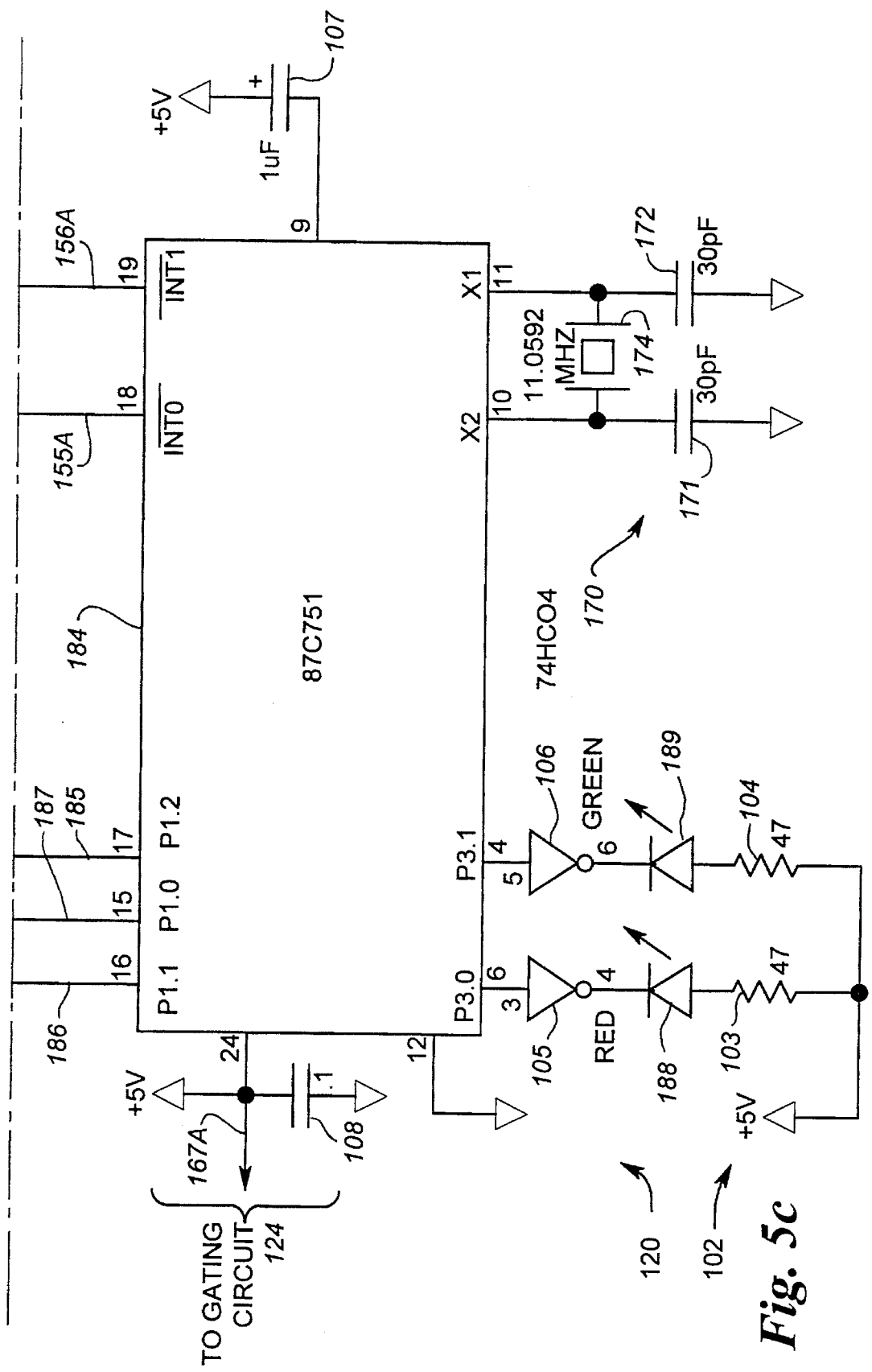
Figure 6:
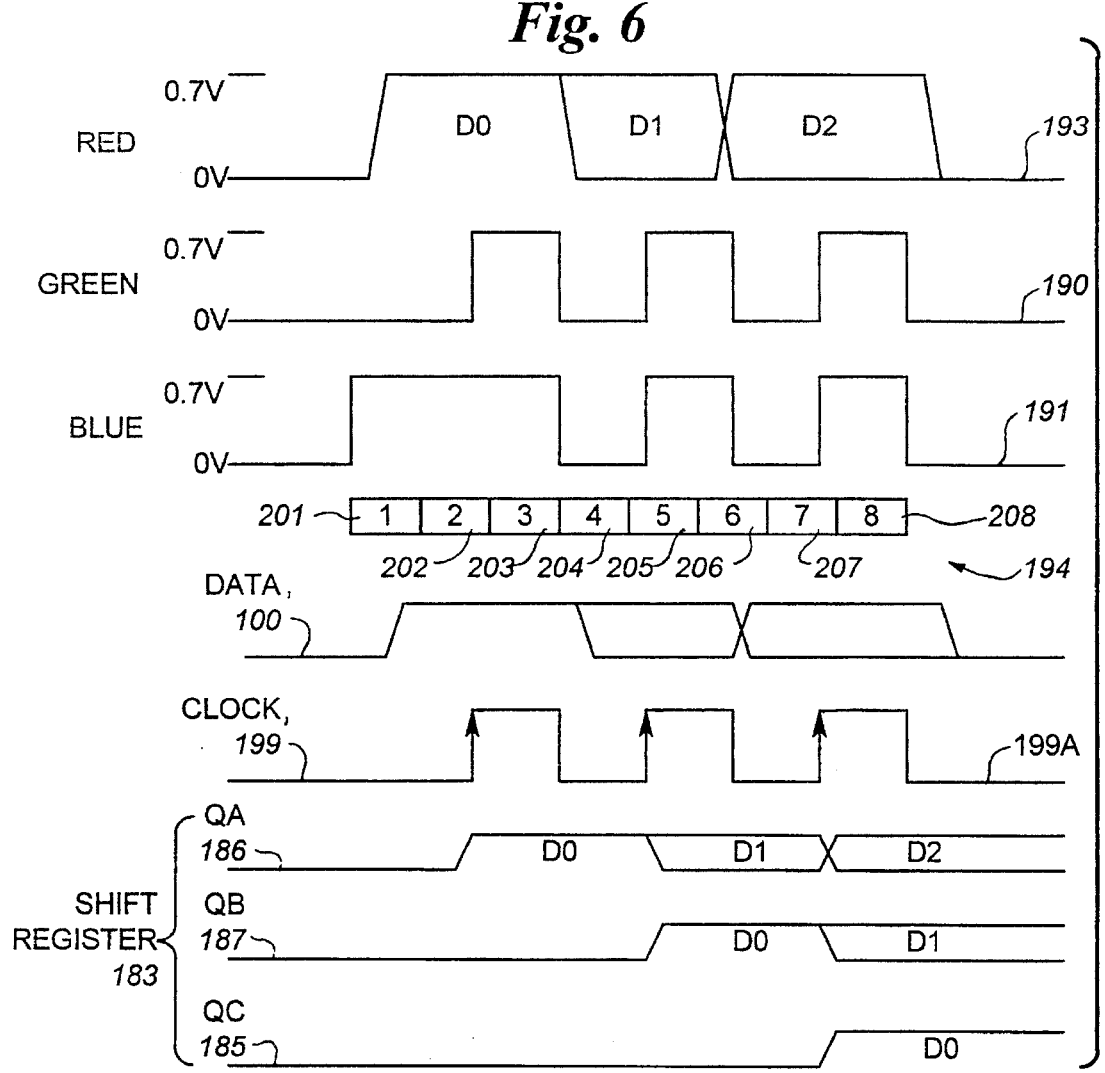
FIG. 6 is a series of waveforms illustrating the operation of the detection circuit of the apparatus of FIG. 5.

Referring now to the drawings and more particularly to FIGS. 5–6, there is shown a data display control apparatus 110 which is constructed in accordance with the present invention, and which is illustrated coupled between a liquid crystal display system 111 and video signal producing system having a personal computer 112 for generating video information signals, and a video monitor 113 for displaying video information. The liquid crystal display system 111 includes a liquid crystal display controller 114 and a liquid crystal display panel 115 for displaying video information. The liquid crystal display controller is substantially the same as controller 14 and will not be described.

The data display control apparatus 110 generally includes a detection circuit 122 for generating command signals to control the storing of video information into the buffer memory 130 and a gating or buffer unit 124 responsive to the detection circuit 122 for gating the video information into the buffer memory 130. The buffer unit 124 is substantially similar to the buffer unit 24 and will not be described in greater detail.

Figure 7:
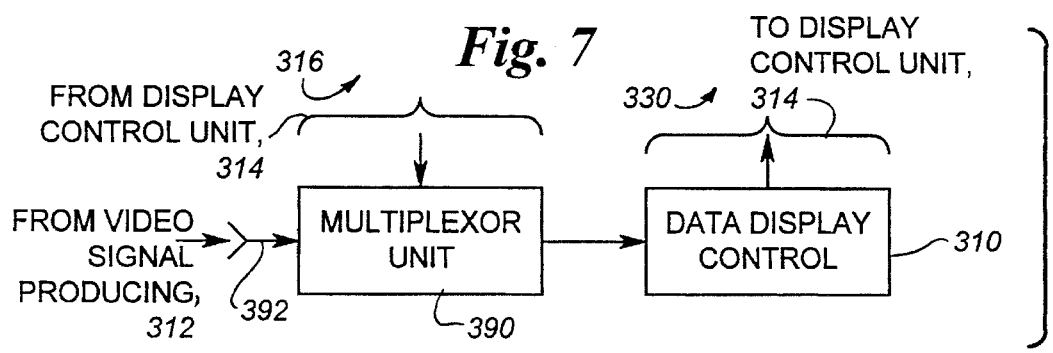
FIG. 7 is a block diagram of a display control apparatus, which is also constructed in accordance to the present invention.

Considering now the detection circuit 122 in greater detail with reference to FIG. 7, the detection circuit 122 generally includes a clock circuit 118 for producing a synchronizing clock signal 199, a data conversion circuit 119 for converting a red analog video information signal 143 into a digitized video information signal or a data signal 100, and a control circuit 120 including a shift register 183 and microprocessor 184. The shift register 183 is responsive to the data and clock signals 100 and 199 respectively for temporarily storing data command signals transmitted by the personal computer 112. The microprocessor 184 samples the data stored in the shift register 183 during specific predetermined time periods to determine whether the data stored in the shift register 183 is indicative of either a LIVE mode of operation command or a HOLD mode of operation command. If a LIVE mode is detected, a control signal 167A goes to a logical HIGH. If a HOLD mode is detected, the control signal 167A goes to a logical LOW.

For the purpose of providing proper sources of electrical energy for the detection circuit 122, the data display control apparatus 110 also includes a direct current power system 162. In this regard, a power supply (not shown) provides 9 VDC power to a voltage converter 179 through a filtering network 162 consisting of a diode 163 and capacitor 164. The diode 163 is a IN4002 diode having its cathode connected to the input of the converter 179 and to the capacitor 164. The anode of diode 163 is connected to the 9 VDC power supply. The capacitor 164 is a 1 μf capacitor connected between a ground potential and the input to the converter 179. The voltage converter 179 causes 5 volts direct current voltage to be produced from the 9 VDC source. The converter 179 is a 78L05 converter.

The power system 123 also includes a voltage converter 182 for producing a negative 5 VDC energy source. The converter is an LTC 1044 converter. As best seen in FIG. 13, the converter 182 has its input connected to the output of the voltage converter 179 via a conductor 179A. For the purpose of smoothing the output voltage from converter 179, the power system includes a pair of filter capacitors 167 and 168 connected in parallel between ground potential and the conductor 179A.

The output of converter 182, a negative 5 VDC, is connected to the comparator 181 via a conductor 182A. For the purpose of smoothing the output voltage from converter 182, the power system also includes a pair of filter capacitors 141 and 142. Capacitor 141 is a 10 μf capacitor connected between ground and the output of converter 182. Capacitor 142 is a 0.1 μf capacitor connected between ground and the output of converter 182. A capacitor 174 is also connected to the converter 182. The capacitor 174 is a 10 μf capacitor.

Considering now the data conversion circuit 119 in greater detail with reference to FIG. 5, the data conversion circuit generally includes a differential analog comparator 180 having a positive and a negative input 121 and 122A respectively. A reference voltage 146 is supplied to the positive input 122A via a voltage divider 196 that will be described hereinafter in greater detail. The negative input is coupled to the red analog signal 143 through a 4.7K coupling resistor 165.

Considering now the clock circuit 118 in greater detail, in order to sample the red analog video signal 143 during other than transition times, the clock circuit 118 generally includes a differential comparator 181 for generating the clock signal 199. The comparator 181 includes a negative and a positive input which are coupled to a green analog signal 144 and a blue analog signal 145 respectively through a pair of 4.7K coupling resistors 160 and 161 respectively. For the purpose of enabling proper sampling of the red analog signal 143, the green and blue analog signals 144 and 145 are encoded also.

In order to prevent the comparators 180 and 181 from oscillating when their input signals are substantially equal to each other, the detection circuit 122 includes a pair of 1M ohm feedback resistors 194 and 195 respectively. Resistors 194 and 195 add hysteresis to comparators 180 and 181 respectively. In this regard, the resistors 194 and 195 prevent the comparators 180 and 181 respectively from switching or oscillating during "black" video intervals when all three analog signals 143–145 are at about 0 volts.

As best seen in FIG. 5, resistor 194 is connected between the output of voltage divider 196 also includes a smoothing capacitor 140 which helps to eliminate any discontinuity which may occur as the analog signals 144 and 145 make transitional changes. Resistors 162 and 166 provide pullup resistors for the open-collector outputs of comparators 181 and 180, respectively.

The reference voltage 146 is an ideal threshold voltage for detection changes in the red analog signal 143, which for purposes of encoding has only one of two values, either 0 volts or 0.7 volts in a VGA type system.

In order to develop a proper reference level voltage for the analog comparator 180, the detection circuit 122 also includes a voltage divider 196 having a pair of equal values 1.8K resistors 197 and 198. The resistors 197 and 198 are connected between the positive input to comparator 180 and the green and blue analog signal connected to resistors 160 and 161 respectively. The voltage divider 196 produces a reference voltage 146 that is half the difference of the green analog signal 144 and the blue analog signal 145. Thus, for a VGA signal a reference voltage of about 0.35 volts or 0.7/2 volts is applied to the positive input to comparator 180. The video drive module for an IBM VGA display adapter produces analog video signals having a voltage range between about 0 volts and 0.7 volts. Thus, during the time the signal producing device 112 is generating a video command byte, the green analog signal 144 and the blue analog signal 145 have opposite values as shown in Table I.

TABLE I

|  | Voltage Values | |
| --- | --- | --- |
| Green Analog Signal 144 | 0 volts | 0.7 volts |
| Blue Analog Signal 145 | 0.7 volts | 0 volts |

From the foregoing, it should be understood the red analog signal 143 is used as a data signal, which is sampled by the clock signal 199 generated from the green and blue analog signals 144 and 145. Comparator 180 thus, establishes a threshold value of half of the peak value of the green and blue analog signals. For example, the green and blue analog signals 144 and 145 are arranged to always be opposite in phase, giving an effective clock signal 199 at the output of the comparator 181 which does not depend on the absolute signal levels of the green and blue signals. The green and blue analog signals 144 and 145 are thus encoded to form the clock signal 199. In this regard, the video command signals are encoded on a red analog signal 143 generated by the device 112 and coupled to the analog comparator 180 through a 4.7K coupling resistor 165.

Considering now the control circuit 120 in greater detail with reference to FIG. 5, the microprocessor 184 samples data in the shift register 183 at predetermined periodic time. For the purpose of initializing the shift register 183 for sampling by the microprocessor 184, the control circuit 120 includes a pair of inverters 154 and 155 which respond to a HSYNC signal developed by the personal computer 112. In this regard, a reset signal 155A is generated at the beginning of each new horizontal line by the pair of inverters 154 and 155 in response to the HSYNC signal 139. The reset signal 155A resets the shift register 183 and interrupts the microprocessor 184 at the beginning of each new horizontal line.

In order to interrupt the microprocessor 184, the control circuit 120 also includes an inverter 156 which is responsive to a VSYNC signal 138 produced by the personal computer 112.

In order to freeze or hold the data in the shift resister 183, the control circuit 120 further includes a mode control inverter 173. The mode control inverter 173, as well be explained hereinafter, selectively prevents data from being shifted by the shift register 183.

Considering now the operation of the detection circuit 122 with reference to FIGS. 5 and 6, a pattern of transitions in the red, green and blue analog signals 143–145 is indicated by a set of waveforms 193, 190 and 191. In this regard, two bits of control information may be encoded via the signals 143–145.

For the purpose of understanding the operation of the detection circuit 122, FIG. 6 indicated a reference box 194 which is indicative of the first eight pixel elements in a frame of video information as displayed in the upper left hand corner of the liquid crystal display panel 115. The reference box 194 is disposed below the waveform 190–193 to help indicate the state of the waveform 190–193 relative to the first eight pixels displayed.

Referring now to FIG. 6, each of the analog signals 143–145 begin at a 0 volt level, representing "black," which is the state of the signals during each blanking interval. Detection of a coded command, beginning when the blue analog signal 145 as shown by waveform 191 raises to its full scale value at a first pixel interval 201, while the green analog signal 144 is held in its off state or at the 0 volt level, as shown by waveform 190. When signals 144 and 145 are held in these states, node A in FIG. 5 has sufficient time to charge to about ½ (0.7 volts) or about 0.35 volts establishing a threshold for the red data signal as indicated by waveform 193.

The green analog signal 144 and the blue analog signal 145 are then toggled 180° out of phase for a three pixel time period (3, 4, 5 in box 194) as shown by waveforms 190 and 191. This sequence cause the output of comparator 181 to produce an output signal 199 indicative of three clock pulses as shown by waveform 199A.

Referring now to reference box 194, at a second pixel interval 202, the red analog signal 143 makes a transition to a maximum voltage of about 0.7 volts as shown by waveform 193. This results in the output data signal 100 of comparator 180 going to a positive or logical HIGH.

At a third pixel interval 203, the green and blue analog signals 144 and 145 make transitions, causing the output clock signal 199 from comparator 181 to make a positive transition. The occurrence of the clock signal 199 with the data signal 100 being a logical HIGH allows the positive data signal to be stored in the shift register 183. In this regard, an output QA signal 186 goes to a positive level.

At a fourth pixel interval 204, the red analog signal 143 assumes either a 0 volt or a 0.7 volt level indicative of a logical LOW or a logical HIGH.

At a fifth pixel interval 205, the clock signal 199 makes another transition allowing the data signal 100 to be sampled and shifted into the shift register 183. In this regard, a second shift register output QB signal 187 goes to a positive level while the QA signal 186 goes to either a logical LOW or HIGH level depending upon the level of the data signal 100.

At a sixth pixel interval 206, red analog signal 143 again assumes either a 0 volt or a 0.7 volt level causing the data signal 100 to assume either a logical LOW or HIGH level.

At a seventh pixel interval 207, the clock signal 199 makes another transition allowing the data signal 100 to be sampled and shifted into the shift register 183. When the data signal 100 is shifted into the shift register 183, a third shift register output QC signal 185 goes to a logical HIGH level while the output QA and QB signals 186 and 187 respectively assume appropriate logical states depending upon the states of the data signal 100 and the output QA signal 186.

At an eight pixel interval 208, the red, green and blue analog signals 193, 190 and 191 all return to their quiescent condition. From the foregoing, it will be understood the clock signal 199 is arranged (as shown by the arrows) to sample the data signal 100 derived from the red analog signal 143 on its LOW to HIGH transitions, thus, giving the data signal 100 time to stabilize.

Considering the operation of the detection circuit 122 in still greater detail, the shift register 183 accepts the clock signal 199 and the data signal 100 to produce a two bit decoded output formed from the QA signal 186 and the QB signal 187 respectively. The HSYNC signal 139 causes the shift register 183 to be reset at the beginning of every scan line. Thus, the output signals of the shift register 183 assume a logical low level. In this regard, the QA, QB and QC output signals 186, 187 and 185 respectively all go to logic LOW levels.

In order to inhibit shifting by the shift register 183, the output QC signal 185 is connected to the mode control inverter 173 which produces a mode control signal 101. In this regard, whenever the mode control signal 101 is a logical HIGH, the shift register 183 is enabled to shift data to the right from QA to QB to QC. conversely, whenever the mode control signal 101 is a logical LOW, the shift register 183 is disabled or inhibited from shifting. It should therefore be understood, when the shift register 183 is reset, the mode control signal 101 goes to a logical HIGH and remains HIGH until the output QC signal 185 goes to a logical LOW.

Referring again to FIG. 5, as previously described the first bit of information (D0) shifted into the shift register 183 is always a logical HIGH as shown by waveform 193. Thus, after three transitions of the sampling clock signal 199, this HIGH bit of information has propagated to cause the output QC signal 185 to go to a logical HIGH. When the output QC signal 185 goes to a logical HIGH, the mode signal 101 goes to a logical LOW thus, inhibiting further shifting of data in the shift register 183.

As best seen in FIG. 5, when the output QC signal 185 goes to a logical LOW, the microprocessor 184 detects the signal 185 has gone LOW. The microprocessor 184 responds by reading the two bit code developed by the output QA and QB signals 186 and 187 respectively.

In order to assure the microprocessor 184 samples only the data in the upper left portion of each frame of video information, the $\overline{VSYNC}$ signal 138 is coupled to the microprocessor 184 via the inverter 156 to reset an interval horizontal line counter. Similarly, the microprocessor 184 counts HSYNC pulse signals 155A to increment the horizontal line counter. It will be understood by those skilled in the art, that although microprocessor 184 detects the first line, the microprocessor 184 may detect coded bytes on any arbitrary horizontal line or lines by waiting for any particular horizontal line count.

To prevent false triggering by video data that may otherwise be normally displayed by the liquid crystal display 115, the microprocessor 184 checks for the code byte and its complement. In this regard, the code byte in a first frame of data must be inverted in a second frame of data before the microprocessor 184 will consider the first byte as a valid command.

Considering now the detection circuit 122 in still greater detail, the detection circuit 122 includes a command indication circuit 102 to inform a user of a particular mode of operation. The command indication circuit generally includes a pair of light emitting diodes 188 and 189 which have their anodes coupled to the output of converter 179 via a pair of 47 ohm resistor 103 and 104 respectively. The cathodes of diodes 188 and 189 are coupled to two output ports of the microprocessor 184 via a pair of inverters 105 and 106 respectively.

In order to smooth the power signal applied to the shift register 183 and the microprocessor 184, the +5 VDC signal from converter 179 is filtered by a set of capacitors 107, 108 and 109 respectively.

As best seen in FIG. 7, the microprocessor 184 is controlled by a oscillator circuit 170. The oscillator circuit 184 is connected to the microprocessor 184 and generally includes a 11-0592 MHz crystal oscillator 174 and a pair of 30 pf load capacitors 171 and 172.

Referring now to the drawings and more particularly to FIG. 4, there is shown a data display control apparatus 210 which is constructed in accordance with the present invention. The data display control apparatus 210 generally includes a detection circuit 222 and gating circuit 224. The data display control apparatus 210 is substantially similar to data display control apparatus 10 except the detection circuit 222 has a different logic array 255. In this regard, the detection circuit 222 includes a microprocessor 244, a set of shift registers 250–252, and a control flip-flop 253. The data display control apparatus 210 operates substantially identical to apparatus 10 except for the manner in which the reset enable signal 63 is generated by the logic array 255. The logic array 255 will be described in greater detail hereinafter.

Logic array 255 activates the reset enable signal 263 when any one of the least significant bits from the red, green and blue shift registers 250, 251 and 252 respectively is a logical HIGH when the other least significant bits are a logical LOW. Thus, it would be understood, the first "red," "green," or "blue" pixel after the horizontal blanking signal would disable the shift registers 250–252.

As best seen in FIG. 4, the logical array 255 generally includes an OR gate 256 for generating the reset enable signal 263. The OR gate 256 is connected to a set of three AND gates 257, 258 and 259 respectively.

The AND gate 257 generates a logical HIGH signal 280 whenever the blue pixel signal A1 on an output conductor 272 is a logical HIGH while the negative red pixel signal A3 and the negative green pixel signal $\overline{A2}$ on a pair of output conductors 270 and 271 respectively are both a logical HIGH.

The AND gate 258 generates a logical high signal 281 whenever the green pixel signal A2 on the output conductor 274 is a logical HIGH while the negative red pixel signal A3 and the negative blue pixel signal $\overline{A1}$ on conductors 270 and 273 respectively are a logical HIGH.

The AND gate 259 generates a logical high signal 282 whenever the red pixel signal A3 on an output conductor 275 is a logical HIGH while the negative green pixel signal $\overline{A2}$ and the negative blue pixel signal $\overline{A1}$ on conductors 271 and 273 respectively are a logical HIGH.

From the foregoing it should be understood that once the shift registers 250–252 are disabled, the data in the shift registers 250–252 would be indicative of the next seven bits of pixel data after the special data pattern is detected by the array logic 255. The data in the shift registers 250–252 is indicative of valid video information and would be read by the microprocessor 244 for further processing.

Referring now to the drawings and more particularly to FIG. 3, there is shown a data display control apparatus 410 which is constructed in accordance to the present invention. The data display control apparatus 410 is substantially similar to data display control apparatus 10 except the detection circuit 422 has a different logic array 455. In this regard, the detection circuit 455 includes a microprocessor 444, a set of shift registers 450–452 and a control flip-flop 453.

FIG. 3 illustrates the logic array 455. Logic array 455 disables the reset enable signal 463 when all of the shift registers, such as shift registers 450–452 contain logical HIGH data; e.g. "white" pixel information. Logic array 455 includes a single AND gate 456 having three inputs from the least significant bit 470 of the red shift register 450, the least significant bit 471 from the green shift register 451, and the least significant bit 472 from the blue shift registers 452. Thus, it should be understood with reference to FIG. 3, the first white pixel after horizontal blanking signal would disable the shift registers 450–452.

Referring now to the drawings and more particularly to FIG. 7, there is shown a data control apparatus 310 which is constructed in accordance to the present invention.

The data display control apparatus 310 is adapted to be used with a liquid crystal display controller 314 having a set of analog to digital converters 316 and a bit-map memory array 330. As the display control unit 314 is substantially the same as controller 14, liquid crystal display controller 314 will not be described in greater detail.

Data control apparatus 310 is substantially similar to data display control apparatus 10, except it includes a multiplex unit 390 which enables either the three most significant bits of serial video data from the analog to digital converters 316, or a 3-bit serial command code sequence from a serial port 392 connected to a video signal producing device 312 to be processed. In this regard, it should be understood that the serial port 392 enables the control commands to be sent directly to the data display control apparatus 310 as opposed to being encoded in the analog video signal produced by the device 312.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. In combination with a liquid crystal display unit and means for producing video signals, a data display control apparatus, comprising:

discriminating means responsive to a predetermined sequence of the video signals for decoding them and generating a data command signal so that the liquid crystal display unit using the video signals can respond thereto for display utilization purposes;

means responsive to said data command signal for enabling the liquid crystal display unit to receive selectively the video signals generated by the means for producing video signals for display utilization purposes; and wherein said discrimination means is differential comparator means for establishing a video information signal and for generating a clock signal to sample said information signal to facilitate the generation of said data command signal.

2. In combination with a liquid crystal display unit and means for producing video signals, a data display control apparatus according to claim 1, wherein said means for enabling includes gating means for enabling only a single frame of video information to be sent to the liquid crystal display unit for display purposes.

3. In combination with a liquid crystal display unit and means for producing video signals, a data display control apparatus according to claim 1, wherein said liquid crystal display unit includes a liquid crystal display panel for displaying video images;

wherein the means for producing video signals includes a video monitor for displaying video images; and wherein said means for enabling includes gating means for enabling a single frame of video information in a sequence of consecutive frames of video information produced by the means for producing video signals to be sent to the liquid crystal display panel so that different frames of video information may be displayed at the same time by said liquid crystal display panel and said video monitor.

4. A data display control apparatus according to claim 1, further comprising:

means for conveying said data command signal or the video signals via a video signal path to facilitate controlling the display unit; and wherein said discrimination means is coupled to the means for producing video signals via the video signal path for receiving the video signals;

means responsive to said discrimination means for generating a signal indicative of a data command to control the display unit; and wherein said means for enabling includes gating means responsive to said data command signal for enabling the display unit to receive selectively the video signals generated by the means for producing video signals for display purposes.

5. An apparatus according to claim 1, wherein said data command signal is indicative of a HOLD FRAME data command for preventing the liquid crystal display unit using video signals from displaying more than a single frame of video information repetitively.

6. A display control apparatus according to claim 1, wherein the liquid crystal display unit is in combination with a display system for producing a plurality of independent data displays from video information; wherein said means for producing video signals is a single video signal producing device;

wherein said discrimination means includes:

means for receiving encoded pixel information signals indicative of a data display command for preventing more than a single frame of video information from being displayed by individual ones of the plurality of independent data displays;

said encoded pixel information signals being arranged in a predetermined series of pixel information signals included in the video information produced by the single video signal producing device; and means for preventing more than a single frame of video information from being displayed by individual ones of the plurality of independent data displays;

whereby the plurality of independent data displays in response to the single video signal producing device are enabled to display different frames of video information simultaneously.

7. A system according to claim 6, further comprising:

analog to digital converter means responsive to the video information produced by the single video signal producing device for generating a series of digitized video information signals indicative of a plurality of frames of video information to be displayed by the plurality of independent data displays simultaneously.

8. A data display apparatus, according to claim 4, wherein said discrimination means includes synchronization means responsive to said predetermined sequence of video signals for generating synchronizing signals to synchronize the display unit with the video signals generated by the means for producing video signals.

9. A method of utilizing the apparatus of claim 1, comprising:

controlling the liquid crystal display unit via said data command signal;

detecting said predetermined sequence of video signals generated by the means for producing video signals;

responding to said predetermined sequence of video signals by sending said data signal to facilitate controlling the liquid crystal display unit.

10. A data display control apparatus according to claim 4, wherein said data command is an OVERLAY FRAME data command for enabling the equipment using video signals to display respectively on at least one frame of video information overlay video information.

11. A data display control apparatus according to claim 4, wherein said data command is a MODIFY data command for enabling the equipment using video signals to modify a portion of at least one frame of displayed video information.

12. A data display control apparatus according to claim 4, wherein said data command is a CHANGE DISPLAY data command for enabling the equipment using video signals to change substantially a currently displayed frame of video information.

13. A data display control apparatus according to claim 4, wherein said data command is a BLANK command for preventing the equipment using video signals from displaying video information generated by the video signal producing device.

14. A data display control apparatus according to claim 4, wherein said data command is a DISPLAY data command for enabling the equipment using video signals to display video information generated by the video signal producing device.

15. A data display control apparatus according to claim 4, wherein said data command is an IGNORE COMMAND data command for enabling the equipment using video signals to ignore subsequent data commands.

16. A data display control apparatus according to claim 4, wherein said data command is a RESTORE data command for enabling the equipment using video signals to respond to subsequent data commands.

17. A data display control apparatus according to claim 1, further comprising:

signal processing means for selectively encoding control commands in the video signals for display control purposes; and wherein said means for enabling includes:

controller means responsive to said data command signal for enabling certain ones of the video signals to be utilized by the controller means independently of the display unit for other than displaying images.

18. A data display control apparatus for equipment using video signals generated by a video signal producing device, comprising:

discrimination means responsive to the video signals for decoding them and for generating a signal indicative of a data command so that equipment using video signals can respond thereto for data display utilization purposes; and gating means responsive to said data command signal for enabling the equipment using video signals to receive selectively the video signals generated by the video signal producing device for display purposes; and wherein said discrimination means is differential comparator means for establishing a video information signal and for generating a clock signal to sample said information signal to facilitate the generation of said data command signal.

19. An apparatus according to claim 18, wherein said differential comparator means includes a pair of differential comparators.

20. An apparatus according to claim 19, wherein one of said differential comparators compares at least two video signals indicative of pixel information for producing two different colored pixel images.

21. An apparatus according to claim 20, wherein the other one of said differential comparators compares another video signal indicative of pixel information for producing a pixel image having another color and a differential pixel information signal indicative of one half the absolute value of the last mentioned two video signals.

* * * * *

UNITED STATES PATENT AND TRADEMARK OFFICE
CERTIFICATE OF CORRECTION

PATENT NO. : 5,499,036

DATED : March 12, 1996

INVENTOR(S) : Lane T. Hauck

It is certified that error appears in the above-indentified patent and that said Letters Patent is hereby corrected as shown below:

TITLE PAGE:

Item 63, delete the entire paragraph, and substitute therefor --Continuation-in-part of Serial No. 07/586,506, now U.S. patent 5,225,817, filed 09/21/90, which is a continuation-in-part of Serial No. 07/546,238, filed 06/29/90, now abandoned, and a continuation-in-part of Serial No. 07/506,621, filed 04/09/90, which is a continuation-in-part of Serial No. 07/506,429, filed 04/09/90, which is a continuation of Serial No. 07/472,668 filed 01/30/90, now abandoned, and a continuation-in-part of Serial No. 07/222,144, filed 07/21,88, now abandoned.--.

UNITED STATES PATENT AND TRADEMARK OFFICE
CERTIFICATE OF CORRECTION

PATENT NO. : 5,499,036
DATED : March 12, 1996
INVENTOR(S) : Lane T. Hauck

It is certified that error appears in the above-indentified patent and that said Letters Patent is hereby corrected as shown below:

Column 1, lines 7-25, delete entire paragraph, and substitute therefor --This application is a continuation-in-part of U.S. patent application Serial No. 07/586,506, now U.S. patent 5,225,817 entitled "HIGH SPEED COLOR DISPLAY SYSTEM AND METHOD OF USING SAME," filed September 21, 1990 which is a continuation-in-part of U.S. patent application Serial No. 07/546,238 entitled "STACKED DISPLAY PANEL CONSTRUCTION AND METHOD OF MAKING SAME," filed June 29, 1990, now abandoned, and a continuation-in-part of U.S. patent application Serial No. 07/506,621 entitled "STACKED DISPLAY PANEL CONSTRUCTION AND METHOD OF MAKING SAME," filed April 9, 1990 which is a continuation in part of U.S. patent application Serial No. 07/506,429 filed April 9, 1990 which is a continuation of U.S. patent application Serial No. 07/472,668 filed January 30, 1990, now abandoned, and a continuation-in-part of U.S. patent application Serial No. 07/222,144 filed July 21, 1988 entitled "GRAY SCALE SYSTEM FOR VISUAL DISPLAYS," now abandoned. Each of the above-referenced patents and patent applications are incorporated herein by reference as though fully set forth herein.--.

Signed and Sealed this

Eighth Day of July, 1997

Attest:

BRUCE LEHMAN

Attesting Officer

Commissioner of Patents and Trademarks